(12) United States Patent (10) Patent No.: US 8,468,388 B2
Bhogal et al. (45) Date of Patent: Jun. 18, 2013

(54) RESTORING PROGRAMS AFTER OPERATING SYSTEM FAILURE

(75) Inventors: Kulvir S. Bhogal, Pflugerville, TX (US); William Griffith, Austin, TX (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/763,735

(22) Filed: Apr. 20, 2010

(65) Prior Publication Data

US 2011/0258486 A1 Oct. 20, 2011

(51) Int. Cl.
*G06F 11/00* (2006.01)

(52) U.S. Cl.
USPC .................. 714/15; 714/36; 709/223

(58) Field of Classification Search
USPC ........................................... 714/15
See application file for complete search history.

(56) References Cited

U.S. PATENT DOCUMENTS

| | | | | |
|---|---|---|---|---|
| 5,710,930 | A * | 1/1998 | Laney et al. | 713/300 |
| 5,748,877 | A * | 5/1998 | Dollahite et al. | 714/36 |
| 6,442,663 | B1 * | 8/2002 | Sun et al. | 711/202 |
| 6,701,454 | B1 | 3/2004 | Fischer et al. | |
| 6,775,779 | B1 * | 8/2004 | England et al. | 726/26 |
| 7,168,071 | B2 | 1/2007 | Wu et al. | |
| 7,454,653 | B2 | 11/2008 | Nicholson et al. | |
| 7,673,175 | B2 * | 3/2010 | Mora et al. | 714/15 |
| 2003/0160831 | A1 * | 8/2003 | Ball et al. | 345/835 |
| 2004/0254986 | A1 * | 12/2004 | Nagamatsu | 709/205 |
| 2005/0223291 | A1 * | 10/2005 | Zimmer et al. | 714/34 |
| 2006/0161602 | A1 * | 7/2006 | Barrs et al. | 707/203 |
| 2008/0086518 | A1 | 4/2008 | Balakrishnan et al. | |
| 2008/0126302 | A1 * | 5/2008 | Mora et al. | 707/3 |
| 2008/0177994 | A1 * | 7/2008 | Mayer | 713/2 |
| 2008/0270838 | A1 * | 10/2008 | Dorai et al. | 714/38 |
| 2009/0138865 | A1 * | 5/2009 | Furbee et al. | 717/168 |
| 2010/0199045 | A1 * | 8/2010 | Bell et al. | 711/137 |

OTHER PUBLICATIONS

Chopdekar, Sandesh et al., "Writing AIX kernel extensions", http://www.ibm.com/developerworks/aix/library/au-kernelext.html (Obtained from the Internet on Dec. 9, 2009) Aug. 15, 2006, 16 pages.

Feng, T. H. and Lee, E. A. 2006. Incremental checkpointing with application to distributed discrete event simulation. *In Proceedings of the 38th Conference on Winter Simulation* (Monterey, California, Dec. 3-6, 2006). L. F. Perrone, B. G. Lawson, J. Liu, and F. P. Wieland, Eds. Winter Simulation Conference. Winter Simulation Conference, 1004-1011.

Ferraiolo, David F., "An Argument for the Role-Based Access Control Model", *In Proceedings of the Sixth ACM Symposium on Access Control Models and Technologies* (Chantilly, Virginia, United States). SACMAT '01. ACM, New York, NY, May 2001, pp. 142-143.

(Continued)

*Primary Examiner* — Kamini Patel
(74) *Attorney, Agent, or Firm* — DeLizio Gilliam, PLLC (57) ABSTRACT

A state restoration unit tracks opening and closing of programs within a computer operating system. Responsive to detecting opening and closing of programs, a state restoration structure is updated. After the computer operating system restarts from a failure, the state restoration structure is accessed. The state restoration unit restores those of the programs indicated as open in the state restoration structure.

16 Claims, 6 Drawing Sheets

OTHER PUBLICATIONS

Hideyo, Imazu, "OMNICONF—Making OS Upgrades and Disk Crash Recovery Easier", http://www.usenix.com/publications/library/proceedings/lisa94/full_papers/hideyo.ps. (Obtained from the Internet on Dec. 14, 2009) Sep. 1994, 6 pages.

Matthews, Mikel L., "Position Paper", *Proceedings of the sixth ACM symposium on Access control models and technologies*, May 2001, p. 144.

Of Zen and Computing, , "Close all your open programs quickly, restore 'em the same way", http://www.ofzenandcomputing.com/zanswers/238 (Obtained from the Internet on Dec. 9, 2009) Dec. 19, 2006, 3 pages.

Rosenberg, John et al., "Operating System Support for Persistant and Recoverable Computations", *Communications of the ACM*, Sep. 1996, pp. 62-69.

Schaufler, Casey, "They Want Froot Loops Why Industry Will Continue to Deliver Multi-Level Security", *In Proceedings of the Sixth ACM Symposium on Access Control Models and Technologies* (Chantilly, Virginia, United States). SACMAT '01. May 2001, pp. 145-146.

Smalley, Stephen, "Which Operating System Access Control Technique Will Provide the Greatest Overall Benefit to Users?", *In Proceedings of the Sixth ACM Symposium on Access Control Models and Technologies* (Chantilly, Virginia, United States). SACMAT '01. May 2001, pp. 147-148.

Tv, Nirmal, "Restore Open Folder Windows after Reboot", http://www.nirmaltv.com/2008/04/20/restore-open-folder-windows-after-reboot/(Obtained from the Internet on Dec. 9, 2008) Apr. 20, 2008, 4 pages.

Watson, Robert, "Statement for SACMAT 2001 Panel", *In Proceedings of the Sixth ACM Symposium on Access Control Models and Technologies* (Chantilly, Virginia, United States). SACMAT '01. May 2001, p. 149.

Wikipedia "Operating system", http://en.wikipedia.org/wiki/Operatingsystem (Obtained from the Internet on Dec. 9, 2009) No publication date found, 19 pages.

\* cited by examiner

RESTORING PROGRAMS AFTER OPERATING SYSTEM FAILURE

BACKGROUND

Embodiments of the inventive subject matter generally relate to the field of computer software and, more particularly, to restoring programs after an operating system failure.

When using a computer system, an operating system executing on the computer system can crash (e.g., because of unhandled exceptions, incorrect memory contents, etc.) and cause the computer system to become inoperable. As a result of the operating system crash, data modifications that were made and a history of applications, files, and webpages that were open when the operating system crashed are often lost, causing an inconvenience to users.

SUMMARY

Embodiments include a method comprising tracking opening and closing of programs within a computer operating system. A state restoration structure is updated based, at least in part, on the tracking opening and closing of the programs within the computer operating system. After the computer operating system restarts from a failure, the state restoration structure is accessed. Those of the programs indicated as open in the state restoration structure are restored.

Another embodiment includes a computer program product for restoring programs after operating system failure, where the computer program product comprises a computer readable storage medium comprising computer readable program code. The computer readable program code is configured to track opening and closing of programs within a computer operating system. The computer readable program code is configured to update a state restoration structure based, at least in part, on the computer readable program code tracking opening and closing of the applications within the computer operating system. The computer readable program code is configured to use the state restoration structure to restore those of the programs indicated as open in the state restoration structure, after the computer operating system restarts from a failure.

Another embodiment includes an apparatus comprising a processor, a network interface coupled with the processor, and a state restoration unit. The state restoration unit is operable to track opening and closing of programs within a computer operating system. The state restoration unit is operable to update a state restoration structure based, at least in part, on the state restoration unit tracking opening and closing of the programs within the computer operating system. After the computer operating system restarts from a failure, the state restoration unit is operable to access the state restoration structure. The state restoration unit is further operable to restore those of the programs indicated as open in the state restoration structure.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to restoring open programs on an operating system desktop, embodiments are not so limited. In some implementations, techniques for restoring open programs as described herein can be extended to keeping track of and restoring background processes on a computer system. In other instances, well-known instruction instances, protocols, structures, and techniques have not been shown in detail in order not to obfuscate the description.

Existing techniques for recovering lost information after an operating system crash involve capturing a screenshot prior to the operating system crash and periodically capturing snapshots of random access memory (RAM). Such techniques restore a last saved state of a computer system (e.g., a last state of the RAM) prior to the operating system crash. However, this involves constantly tracking the state of the RAM and constantly keeping track of the contents of the RAM. This can be a very time-consuming and inefficient process. For example, constantly monitoring and storing the content of 4 gigabytes of RAM consumes memory, and is inefficient. Although some programs such as Microsoft® Word allow recovering content of documents opened within the program, these programs do not keep track of all programs executing on an operating system desktop and do not keep track of documents/URLs opened within the programs. Moreover, some existing techniques rely on a user to initiate operations for storing the content of the RAM (e.g., by clicking a button, closing a laptop, and configuring the computer system to enter a hibernate power mode). Such techniques do not address the situation of the operating system crashing prior to the user having initiated the operations for storing the content of the RAM.

A computer can efficiently recover operating system desktop state after an operating system failure without user initiation. A process executing on the computer monitors opening and closing of programs and of documents without storing a complete snapshot of the computer system (e.g., snapshot of the content of the RAM or snapshot of the content of the cache). Opening and closing programs typically involves a kernel call to the operating system that hosts the programs. A state restoration unit is configured to detect the kernel calls to open and close programs and to maintain a record of the opened programs in a state restoration structure. Following an operating system crash, the state restoration unit identifies programs launched prior to the operating system crash from the state restoration structure and relaunches the programs. In other words, the state restoration unit tracks programs as they are opened and restores the state of the operating system (in terms of programs launched) prior to the operating system crash. Typically, operations for opening and closing programs consume a small percentage (e.g., 5%) of the user's activities on the computer system. Thus, saving only the names and locations of the programs that are opened on the operating system desktop is time-efficient, memory-efficient, and may not consume a large number of CPU cycles or RAM. Moreover, the state restoration unit can address unexpected crashes and is not dependent on user input to initiate operations for maintaining the state of the operating system desktop.

Figure 1:
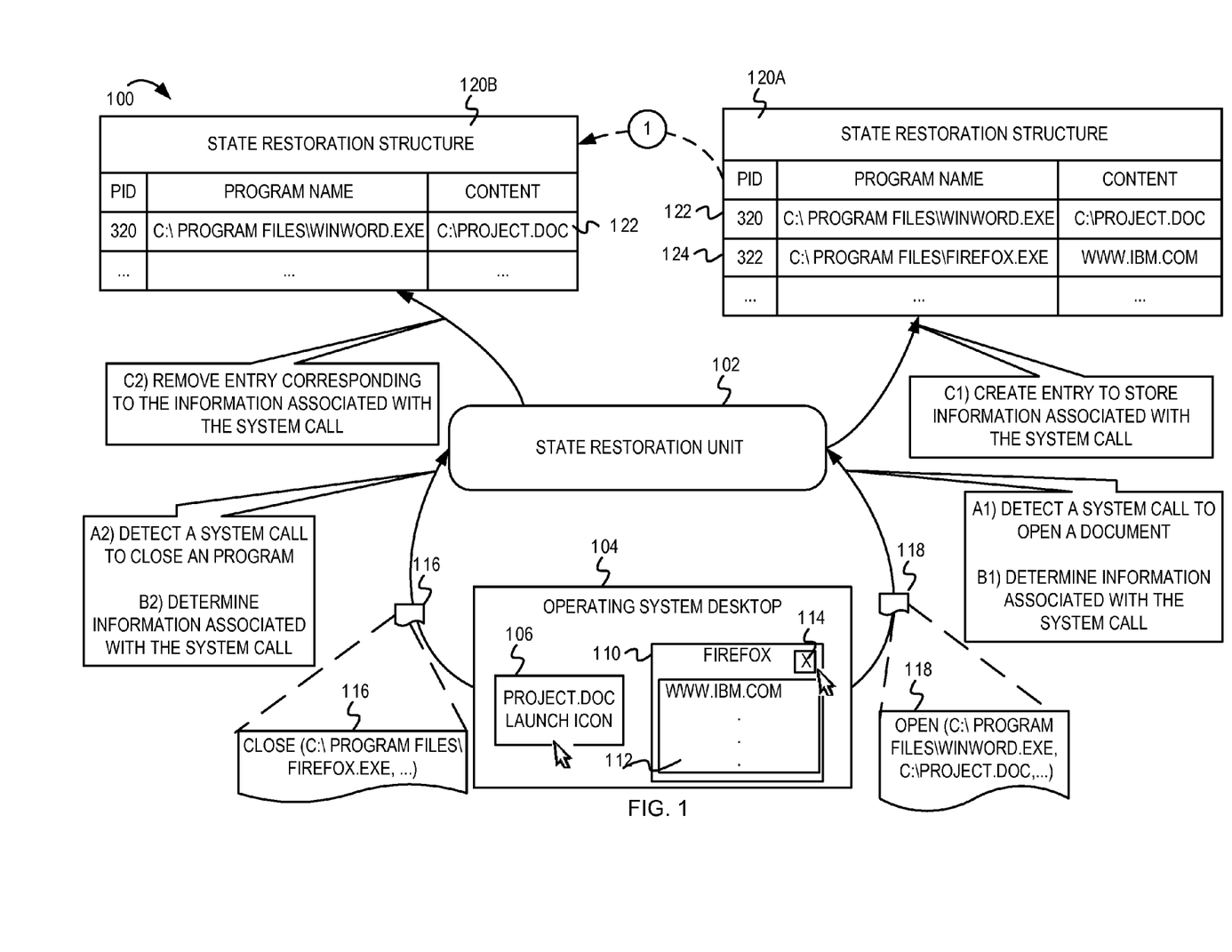
FIG. 1 depicts an example conceptual diagram illustrating maintaining a record of open programs on an operating system desktop.

FIG. 1 depicts an example conceptual diagram illustrating maintaining a record of open programs on an operating system desktop. FIG. 1 depicts a state restoration unit 102 and an operating system desktop 104. In some implementations, the state restoration unit 102 is embodied as an operating system (OS) extension within an operating system on the computer system. In another implementation, the state restoration unit 102 may be a program that is configured to execute on top of the operating system. The state restoration unit 102 implements functionality for storing a record of programs and documents presented on the operating system desktop 104 as will be described in stages A1-C1 and A2-C2.

At stage A1, the state restoration unit 102 detects a system call to open a document. In FIG. 1, the state restoration unit 102 detects a system call 118 to open a Microsoft Word document 106 and to display the document 106 on the operating system desktop 104. A desktop graphical user interface system (e.g., a Desktop Window Manager in a Windows® operating system, a Common Desktop Environment (CDE) in IBM's AIX® operating systems, etc.) (not shown) typically implements functionality to enable a user to graphically interact (e.g., access, modify, configure, etc.) with various software and hardware components of the computer system. The desktop graphical user interface system may detect a user selecting (e.g., double clicking on) an icon that links to the document 106 and may generate the system call 118 to open the document 106. The desktop graphical user interface system provides the system call 118 to the operating system. The system call 118 indicates a name and location of the program, a name and location of the document to be opened, etc. The state restoration unit 102 intercepts the system call 118 to the operating system and reads parameters of the system call 118 (i.e., the name and location of the program, the name and location of the document to be opened, etc.). In some implementations, the state restoration unit 102 may subscribe to the operating system to receive notification of system calls. In other words, on receiving the system call 118 to open the document 106, the operating system may transmit a notification of the system call 118 to the state restoration unit 102. The state restoration unit 102 may receive the system call 118 or may receive a subset of the parameters of the system call 118.

At stage B1, the state restoration unit 102 determines information associated with the system call 118. The state restoration unit 102 may read content/parameters of the system call 118 and determine the name and location of the program to be launched, the name and location of the document to be opened in the program, etc. From the system call 118, the state restoration unit 102 determines that the program C:\Program_Files\Winword.exe should be launched and that the document 106 C:\project.doc should be opened in the program. In some implementations, the state restoration unit 102 may also determine, based on communicating with a kernel module in the operating system, a process identifier associated with the program/document to be opened.

At stage C1, the state restoration unit 102 creates an entry 122 in the state restoration structure 120A to store the information associated with the system call 118. It is noted that the state restoration structure 120A can be implemented as a list, a table, a database, hardware table, or other suitable data structure that persists beyond an operating system crash. For example, the state restoration structure 120A may be implemented on a non-volatile storage medium such as a hard disk drive, flash memory, etc. As depicted in the state restoration structure 120A, the state restoration unit 102 creates the entry 122 indicating the name and location of the program that was opened and the name and location of the document that was presented by the program. The state restoration structure 120A also comprises entry 124 indicating that a Firefox® browser program 110 is opened and indicating a URL (i.e., www.ibm.com) that links to a document 112, which the browser program 110 presents. As depicted, the state restoration unit 102 also stores the process identifier associated with the program and the document.

At stage A2, the state restoration unit 102 detects a system call to close a program. In FIG. 1, the state restoration unit 102 detects a system call 116 to close the browser program 110 and to consequently close the webpage 112 being displayed by the browser program 110. As described above, in some implementations, the desktop graphical user interface system may detect a user closing (e.g., clicking on a close button 114) the browser program 110, may generate the system call 116 to close the browser program 110, and may provide the system call 116 to the operating system. In another implementation, the browser program 110 itself may detect the user closing the browser program 110, may generate the system call 116 to close the webpage 112 being displayed by the browser program 110, and may provide the system call 116 to the operating system. In FIG. 1, the system call 116 indicates a name and a location of the browser program 110 to be closed, a URL that links to the document to be closed. In some implementations, the system call 116 may also indicate other information such as a process identifier associated with the program/document to be closed. The operating system may receive the system call 116 to close the browser 110 and may transmit a notification of the system call 116 to the state restoration unit 102.

At stage B2, the state restoration unit 102 determines information associated with the system call 116. The state restoration unit 102 may read content/parameters of the system call 116 and determine the name and location of the program to be closed, the name/URL of the document to be closed, etc. From the system call 116, the state restoration unit 102 determines that the browser program 110 identified as C:\Program_Files\Firefox.exe that presents the document with URL www.ibm.com should be closed. In the state restoration structure 120A, the entry 124 corresponds to the information associated with the system call 116.

At stage C2, the state restoration unit 102 deletes the entry 124, in the state restoration structure 120A, responsive to the system call 116 to close the browser program 110. The state restoration unit 102 searches through the state restoration structure 120A and determines that the entry 124 comprises all/part of the information associated with the system call 116. In some implementations, the state restoration unit 102 may also identify the entry 124, in the state restoration structure 120A, to be removed based on identifying a process identifier associated with the program/document to be closed. The state restoration unit 102 removes the entry 124 from the state restoration structure 120A. State restoration structure 120B depicts the content of the state restoration structure 120A after the state restoration unit 102 deletes the entry 124 associated with the browser program 110. As depicted by the state restoration structure 120B, the state restoration unit 102 removes the name and location of the browser program 110 that was closed, the name of (or URL that links to) the document 112 presented by the browser program 110, and the process identifier associated with the program/document.

The state restoration unit 102 performs the above-described operations for each system call generated to launch a program, to open a document, to display a webpage, to close a program, to close a document, to navigate to another webpage, etc. The state restoration unit 102 keeps track of open programs/documents displayed on the operating system desktop 104. Thus, the state restoration structure 120B is indicative of a current state of the operating system desktop 104. After an operating system crash, the state restoration unit 102 can use the content of the state restoration structure to restore the state of the operating system desktop 104 prior to the operating system crash as will be described in FIG. 2.

Figure 2:
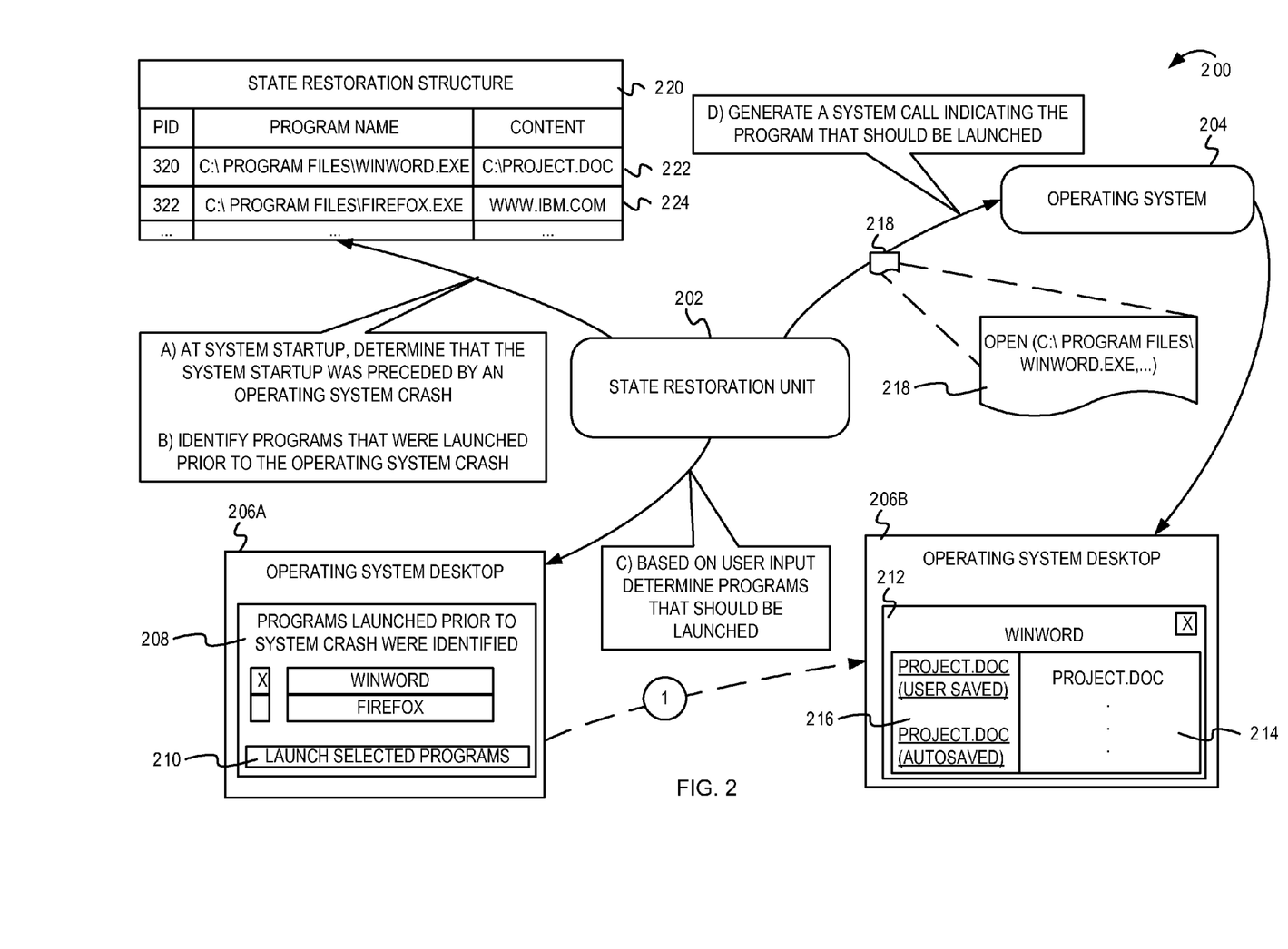
FIG. 2 is an example conceptual diagram for restoring a last state of an operating system desktop prior to an operating system crash.

FIG. 2 is an example conceptual diagram for restoring a last state of an operating system desktop prior to an operating system crash. FIG. 2 depicts a state restoration unit 202, an operating system 204, an operating system desktop 206A, and a state restoration structure 220. In some implementations, the state restoration unit 202 may be an operating system extension in the operating system 204. When a computer system is powered on, a basic input/output system (BIOS) in firmware initiates a boot process. The operating system 204 is booted and the state restoration unit 202 is loaded. In other implementations, the state restoration unit 202 may be a program configured to execute on top of the operating system. The operating system 204 may be configured to automatically start the state restoration unit 202 once the boot process is completed.

At stage A, the state restoration unit 202 determines, at system startup, that the system startup was preceded by an operating system crash. The state restoration unit 202 accesses the state restoration structure 220 and determines content of the state restoration structure 220. The state restoration unit 202 determines that the system startup was preceded by an operating system crash on determining that the state restoration structure 220 comprises at least one program/document that was not shutdown in response to a user input (e.g., in response to receiving a close system call). Alternately, the state restoration unit 202 may determine that the system startup was not preceded by an operating system crash on determining that the state restoration structure 220 does not comprise any content. In some implementations, the state restoration unit 202 may read a flag to determine whether or not the system startup was preceded by an operating system crash. For example, the flag being set to "1" may indicate, to the state restoration unit 202, that the system startup was preceded by an operating system crash.

At stage B, the state restoration unit 202 identifies the programs that were launched prior to the operating system crash. In FIG. 2, the state restoration unit 202 accesses the state restoration structure 220 and identifies two entries 222 and 224 in the state restoration structure 220. From the entry 222, the state restoration unit 202 determines that a first program C:\Program_Files\Winword.exe was launched prior to the operating system crash and that a document C:\project.doc was opened within the first program. From the entry 224, the state restoration unit 202 determines that a second program C:\Program_Files\Firefox.exe was launched prior to the operating system crash and that a document downloaded from a URL (www.ibm.com) was presented by the second program. The state restoration unit 202 also presents an interface 208 on the operating system desktop 206A. On the interface 208, the state restoration unit 202 presents a list of programs that were launched prior to the operating system crash. Via the interface 208, the state restoration unit 202 prompts the user to indicate whether all/some/none of the programs should be re-launched. In FIG. 2, the user indicates that the winword.exe program should be launched and that the Firefox.exe program should not be launched. An indication of the programs that should be launched is transmitted to the state restoration unit 202 after the user clicks on a "launch selected programs" button 210.

At stage C, the state restoration unit 202 identifies, based on user input, the programs that should be launched. In FIG. 2, the state restoration unit 202 determines, based on the user input, that the state restoration unit 202 should launch the program identified by C:\Program_Files\Winword.exe.

At stage D, the state restoration unit 202 generates system calls to launch the identified programs. The state restoration unit 202 generates one system call for each program that should be launched. In FIG. 2, the state restoration unit 202 generates the system call 218 and provides the system call 218 to the operating system 204. The system call 218 indicates the name and location of the program to be launched as determined from the entry 224 in the state restoration structure 220. The state restoration unit 202 may not indicate the name and location of the document to be opened within the application. As depicted in FIG. 2, the system call 218 is of the form "open (C:\Program_Files\winword.exe)". In some implementations, however, the state restoration unit 202 may indicate, in the system call 218, the name and location of the program to be launched as well as the name and location of the document to be opened within the program. For example, the system call 218 may be of the form "open (C:\Program_Files\winword.exe, C:\project.doc)". On receiving the system call 218, the operating system can perform operations for launching the program 212 and for opening the document 214. Operating system desktop 206B depicts the state of the operating system desktop 206A after the program 212 is launched. The state restoration unit 202 may rely on content recovery functionality of the program 212 to restore a last state of the program 212 prior to the operating system crash. As depicted in the operating system desktop 206B, once the program 212 is launched, the program 212 may open the document 214 and may also present options 216 for restoring content that might not have been saved because of the operating system crash.

It should be noted that in some implementations, the program might not have the ability to read/interpret one or more parameters of the system call 218 that identify the document 214 that should be opened in the program 212. To resolve this issue, operating system extensions that provide an interface between the state restoration unit 202 and the program 212 may be implemented. The operating system extensions can be kernel extensions, dynamically loadable modules, etc. The operating system extensions can determine, from the state restoration unit 202, names and locations of documents that were opened within the program 212 prior to the operating system crash. The operating system extensions can provide the names and locations of documents to the program 212 to enable the program 212 to open and present the requisite documents 214. In some implementations, the state restoration unit 202 may display a notification, to the user, indicating documents that were opened within the program 212 prior to the operating system crash.

It is noted that the state restoration unit 102 may be implemented on a computer system (e.g., on a personal computer, a laptop, etc.) and can restore the state of the operating system desktop 104 as described above with reference to FIGS. 1-2. Alternately, the state restoration unit 102 may be implemented on any suitable electronic device such as a mobile phone. The state restoration unit can relaunch the programs that were displayed on the electronic system's display unit prior to operating system failure.

Figure 3:
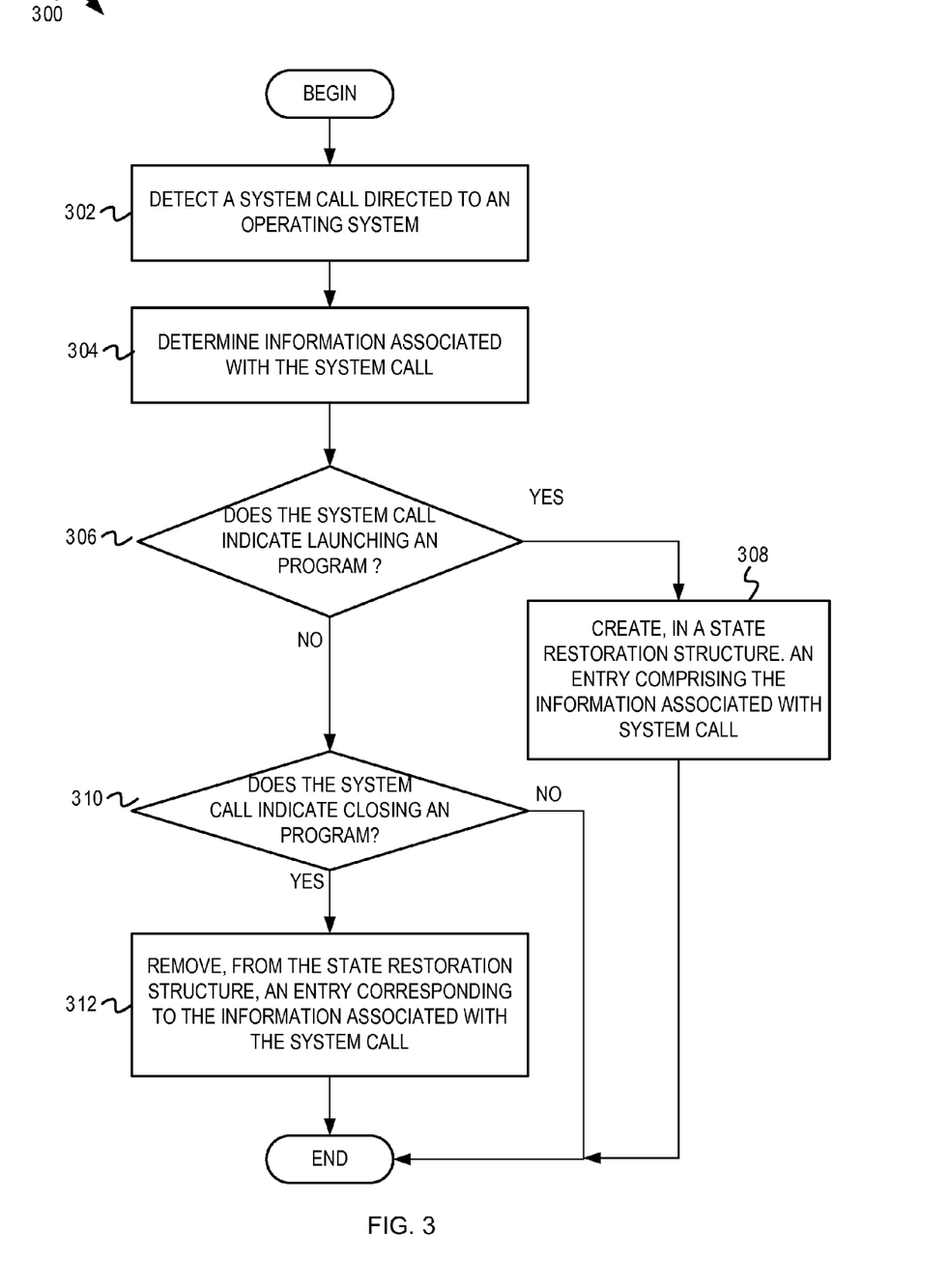
FIG. 3 is a flow diagram illustrating example operations for maintaining a record of open programs on an operating system desktop.

FIG. 3 is a flow diagram illustrating example operations for maintaining a list of open programs on an operating system desktop. Flow 300 begins at block 302.

A system call directed to an operating system is detected (block 302). A state restoration unit may register with the operating system to receive a notification every time the operating system receives a system call from a program, a desktop graphical user interface system, or other suitable electronic device graphical user interface (e.g., a mobile phone's graphical user interface). In some implementations, the operating system may provide the system call to the state restoration unit. In other implementations, the operating system may provide a subset of parameters that constitute the system call (e.g., program name and location, URL that links to a document, document name and location, type of system call (e.g., open, close) etc.). In other implementations, the operating system may be configured to provide a notification/parameters of system calls to open and close programs/documents. As an example, in response to detecting a selection of an icon to launch a program (e.g., detecting a double click on the icon), the desktop graphical user interface system may generate and provide a system call to launch the program to the operating system. In some implementations, the state restoration unit may be an operating system extension (residing within the operating system) and may receive the notifications from a kernel component of the operating system. In another implementation, the state restoration unit may be a program executing on top of the operating system. The state restoration unit may have a hook into the operating system and may receive the notification when the operating system receives a system call. In another implementation, the state restoration unit may be a plug-in or other background process that interacts with the desktop graphical user interface system or with programs installed on a computer system to receive system calls to open or close the programs/documents. The flow continues at block 304.

Information associated with the system call is determined (block 304). The system call can indicate the type of operation to be performed (e.g., whether the program should be opened or closed). The information associated with the system call may be determined based on reading parameters of the system call. The system call can also indicate a name and location of the program that generated the system call, a name and location of the program to be launched, a name and location of documents to be opened, a URL of a webpage to be displayed, etc. In one implementation, the location of the document may be remote (e.g., on another server) and the location of the document may be indicated by the URL. In another implementation, the location of the document may be local (e.g., on the same computer system, on a storage device connected to the computer system, etc.) The flow continues at block 306.

It is determined whether the system call indicates launching a program (block 306). For example, it may be determined whether the system call is an open ( . . . ) system call. In some implementations, the information associated with the system call may be analyzed to determine whether the system call indicates launching the program. If it is determined that the system call indicates launching the program, the flow continues at block 308. Otherwise, the flow continues at block 310.

An entry comprising the information associated with the system call is created in a state restoration structure (block 308). The state restoration structure is indicative of a current state of the operating system desktop. The state restoration structure may be stored in non-volatile memory, in predetermined memory locations on a hard disk, etc. The name and location of an opened program and/or the name and location of the document presented by the program may be stored in the state restoration structure. The location of the document may be in the form of a file path, a URL, etc. For example, the state restoration structure may comprise an entry indicating a location of a word processing program and a location of a document to be opened within the word processing program. As another example, the state restoration structure may comprise an entry indicating a location of an HTML browser program and a URL that links to a document to be presented by the HTML browser program. As yet another example, the state restoration structure may comprise an entry indicating a location of a UNIX shell program and a specific directory to be displayed in the UNIX shell program. In some implementations, a process identifier associated with the program/document may also be stored. From block 308, the flow ends.

It is determined whether the system call indicates closing the program (block 308). The flow 300 moves from block 308 to block 310 on determining that the system call does not indicate launching the program. For example, it may be determined whether the system call is a close ( . . . ) system call. In another implementation, the information associated with the system call may be analyzed to determine whether the system call indicates closing the program. If it is determined that the system call indicates closing the program, the flow continues at block 312. If it is determined that the system call indicates an operation other than opening or closing a program/document, the flow ends.

An entry corresponding to the information associated with the system call is removed from the state restoration structure (block 312). In one implementation, the entry corresponding to the information associated with the system call may be identified based on determining the name and location of the program to be closed and/or the name and location of the document (presented by the program) to be closed. In another implementation, the entry corresponding to the information associated with the system call may be identified based on determining a process identifier associated with the program/document. From block 312, the flow ends.

Figure 4:
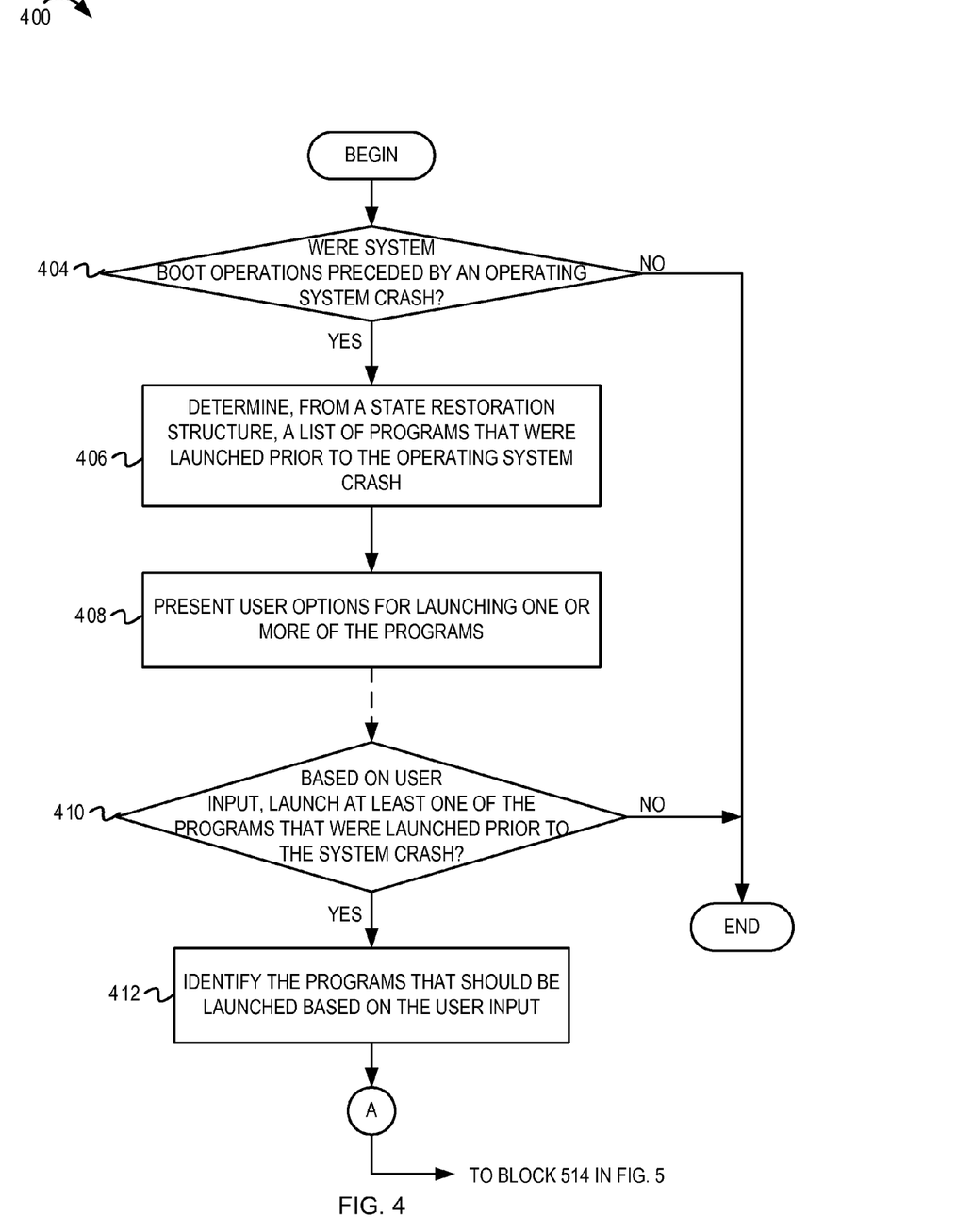
FIG. 4 depicts a flow diagram illustrating example operations for restoring a last state of an operating system desktop prior to an operating system crash.
Figure 5:
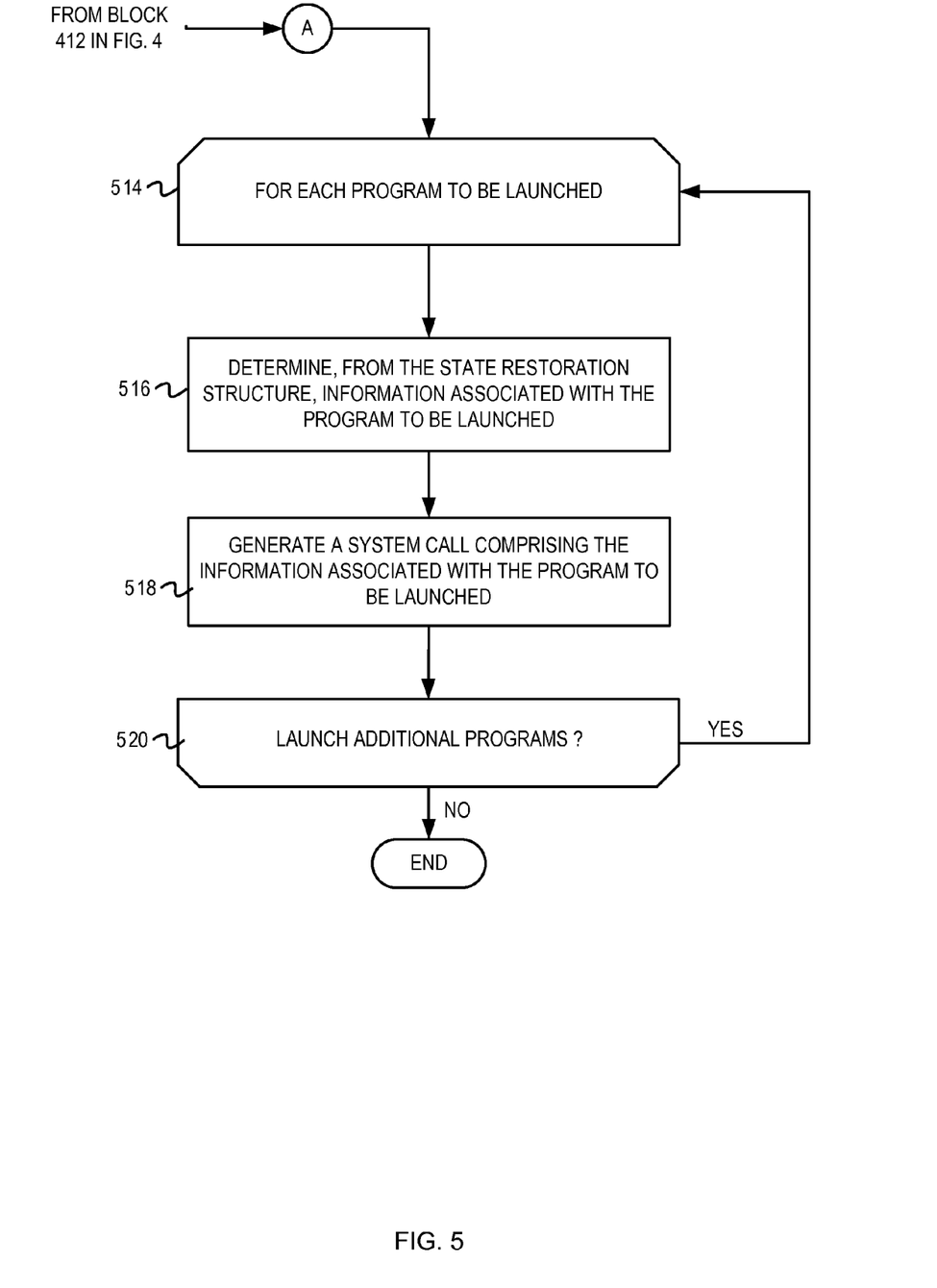
FIG. 5 depicts the flow diagram illustrating example operations for restoring the last state of the operating system desktop prior to the operating system crash.

FIG. 4 and FIG. 5 depict a flow diagram illustrating example operations for restoring a last state of an operating system desktop prior to an operating system crash. Flow 400 begins at block 404 in FIG. 4.

It is determined whether system boot operations were preceded by an operating system crash (block 404). After an operating system is loaded as part of the system boot operations, a program or operating system extension that performs the operations described with reference to flow 400 is loaded into RAM. Previously saved snapshots that indicate a state of an operating system desktop may be consulted to determine whether the system boot operations were preceded by an operating system crash. A state restoration structure may be accessed to determine whether the system boot operations are a result of the operating system crash. For example, it may be determined that the system boot operations were preceded by the operating system crash based on determining that the state restoration structure comprises content (e.g., name and location of programs/documents that were opened prior to the operating system crash). Likewise, it may be determined that the system boot operations were not preceded by the operating system crash based on determining that the state restoration structure does not comprise any content. As another example, a flag may be read to determine whether the operating system crashed prior to the system boot operations. For example, it may be determined that the operating system crashed based on determining that the flag is set to "1". Likewise, it may be determined that the operating system did not crash based on determining that the flag is set to "0". If it is determined that the system boot operations were preceded by the operating system crash, the flow continues at block 406. Otherwise, the flow ends.

Programs that were launched prior to the operating system crash are determined from the state restoration structure (block 406). As described earlier, the state restoration structure may indicate the name and location of programs and documents that were launched prior to the operating system crash. The state restoration structure keeps track of programs that were closed in response to receiving a "close file" system call directed to the operating system. The flow continues at block 408.

User options for launching one or more of the programs are presented (block 408). An interface listing the programs that were opened prior to the operating system crash may be presented to the user. The user may have an option of selecting all/some of the programs that should be relaunched. It should be noted that the user may choose not to launch any of the programs. The flow continues at block 410.

It is determined, based on user input, whether at least one of the programs that were launched prior to the operating system crash should be relaunched (block 410). If it is determined that at least one of the programs that were launched prior to the operating system crash should be relaunched, the flow continues at block 412. If it is determined that none of the programs that were launched prior to the operating system crash should be relaunched, the flow ends.

Based on the user input, the programs that should be launched are identified (block 412). As indicated above, a name and a location of the programs that should be launched are determined. The flow continues at block 514 in FIG. 5.

A loop begins to perform a set of operations (described in blocks 516-520) on each program to be launched (block 514). The flow continues at block 516.

Information associated with the program to be launched is determined from the state restoration structure (block 516). The name and location of the program to be launched can be identified from the state restoration structure. In some implementations, other information such as a position of the program on the operating system desktop (or an electronic device's display unit) may also be determined. In some implementations, a name and location/URL of documents to be presented within the program may also be determined. The flow continues at block 518.

A system call comprising the information associated with the program to be launched is generated (block 518). The system call may be provided to the operating system and may indicate the name and location of the program. For example, a system call of the form open ("C:\Winword.exe") may be provided to the operating system to indicate that a "winword.exe" program should be launched. In some implementations, a name and a location of a document that should be presented by the program may also be indicated in the system call. For example, a system call of the form open (C:\winword.exe, C:\project\report.doc) may be provided to the operating system to indicate that the "winword.exe" program should be launched and that a document "report.doc" should be opened in the program. On receiving the system call, the operating system can perform the necessary operations to launch the program. For example, the operating system may receive a system call to launch an HTML browser and to open a document at a location specified by a URL "www.ibm.com". On receiving the system call, the operating system can open a network link to the URL "www.ibm.com", fetch the corresponding page, and provide the content of the page to the HTML browser for display on the operating system desktop. The flow continues at block 522.

It is determined whether there exist additional programs to be launched (block 522). If it is determined that there exist additional programs to be launched, the flow loops back to block 514 where a next program to be launched is identified and the operations for generating a system call are performed as described in blocks 516-520. Otherwise, the flow ends.

It should be noted that the operations described in the diagrams (FIGS. 1-5) are examples meant to aid in understanding embodiments, and should not be used to limit embodiments or limit scope of the claims. Embodiments may perform additional operations, fewer operations, operations in a different order, operations in parallel, and some operations differently. For example, although FIG. 5 describes a system call being generated to relaunch a program, in some implementations, the program may not have the ability to determine a last state of the program prior to the operating system crash. Therefore, in some implementations, the system call may also indicate documents that should be opened within the program. In some implementations, the program may not have the ability to read/accept parameters (e.g., page number, page name, file path of the document to be opened, etc.) that indicate the documents that should be opened within the program. Thus, the program can be extended by means of operating system extensions that act as an interface between the program and the state restoration unit. The operating system extension can receive a notification from the state restoration unit, identify the documents to be opened within the program, and accordingly notify the program of the documents that should be opened upon initialization of the program. In some implementations, the state restoration unit may present a notification to the user indicating a list of documents that were opened within each of the programs that were relaunched. In other implementations, the state restoration unit may rely on the program to keep track of the documents that were opened within the program, to recover the last state of the program prior to the operating system crash, to recover content that was not saved prior to the operating system crash, etc.

It should be noted that if a user navigates to a different URL, a system call to navigate to the new URL is provided to the operating system so that the operating system can open a new network connection to the new URL. On detecting the system call, the state restoration unit can replace a previously saved URL with the new URL so that the state restoration structure comprises a most recent snapshot of the documents that are open. If the program can open multiple documents (e.g., Firefox.exe allows multiple tabs to be opened within one program), the state restoration unit can keep track of each document (i.e., each URL) presented in the program as a system call is generated for opening each document.

In some implementations, in addition to storing the name and location of HTML browsers and URLs of the documents that are displayed by the HTML browsers, the state restoration structure may also comprise information indicating whether the documents (i.e., webpages) are opened in tabs within a single HTML browser window or within separate HTML browser windows. In other implementations, only the name and location of the HTML browser may be stored. The state restoration unit may rely on content recovery abilities of the HTML browser to keep track of a number of HTML browser windows that were opened, a number of tabs opened within each HTML browser window, URLs that were displayed within each HTML browser window/tab, etc. For example, based on content of the state restoration structure, the state restoration unit may determine that a Firefox.exe program should be launched. The state restoration unit may generate a system call to the operating system indicating that the Firefox.exe program should be launched. Once the Firefox.exe program is launched, code within the Firefox.exe program may determine that the Firefox.exe program was closed because of an operating system crash. Accordingly, the Firefox.exe program can launch its content recovery program, determine a number of windows/tabs that were open, identify webpages that were open, and present the webpages.

It should also be noted that although FIGS. 1-5 describe the state restoration unit 102 storing a subset of the information associated with the system call (e.g., one or more parameters of the system call) in the state restoration structure 120, embodiments are not so limited. In some implementations, the state restoration unit 102 can store the entire system call with all its parameters. To restore the last state of the operating system desktop prior to the operating system crash, the state restoration unit 102 can retrieve the stored system call associated with the program to be opened, modify the system call if required (e.g., update a timestamp, etc.) and provide the system call to the operating system. Alternately, the state restoration unit 102 can retrieve parameters of the stored system call associated with the program to be opened, create a new system call comprising the some/all the parameters of the stored system call, and provide the new system call to the operating system.

It is also noted that although FIGS. 1-5 describe operations for recovering the state of the operating system desktop in the event of an operating system crash, embodiments are not so limited. The operations for recovering the state of the computer system desktop may be implemented responsive to operating system failure resulting from, e.g., power failure. The operations for recovering the state of the computer system desktop may be implemented based on determining that programs were not closed responsive to user input (e.g., a user closing the program) or responsive to executing a shutdown command (or other suitable command that results in a computer being powered down in a controlled manner). A user may reboot the computer system after a power failure and consequently, the operating system restoration unit 102 may also be launched. The operating system restoration unit 102 can identify programs that were opened prior to the power failure from the operating system restoration structure and can generate system calls to open one or more of the programs. Moreover, it is noted that although FIGS. 1-5 describe operations for restoring the state of an operating system desktop on a computer system, embodiments are not so limited. In some implementations, the operations described with reference to FIGS. 1-5 can be implemented to restore the state of an operating system display unit on any suitable electronic device. For example, the state restoration unit may be part of an operating system executing on a mobile phone (e.g., a Blackberry®, an iPhone®, etc). After an operating system failure, the state restoration unit can restore programs that were presented on the mobile phone's display unit prior to the operating system failure.

Lastly, it is also noted that operations for recovering the state of an operating system desktop as described in FIGS. 1-5 can also be extended to a distributed system, where the operating system executes on a server and programs/documents are presented on clients (e.g., thin clients) based on instructions received from the server. In response to receiving a system call to open a program from a client, the state restoration unit 102 executing on the server's operating system can store an indication of the opened program and can also store an indication of the client on which the program is opened. After the server's operating system recovers from an operating system failure (e.g., an operating system crash, a power failure, etc.), the state restoration unit 102 can identify the programs that were opened prior to the operating system failure, can identify programs that were opened on each client connected to the server, and can accordingly open requisite programs on the appropriate clients.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
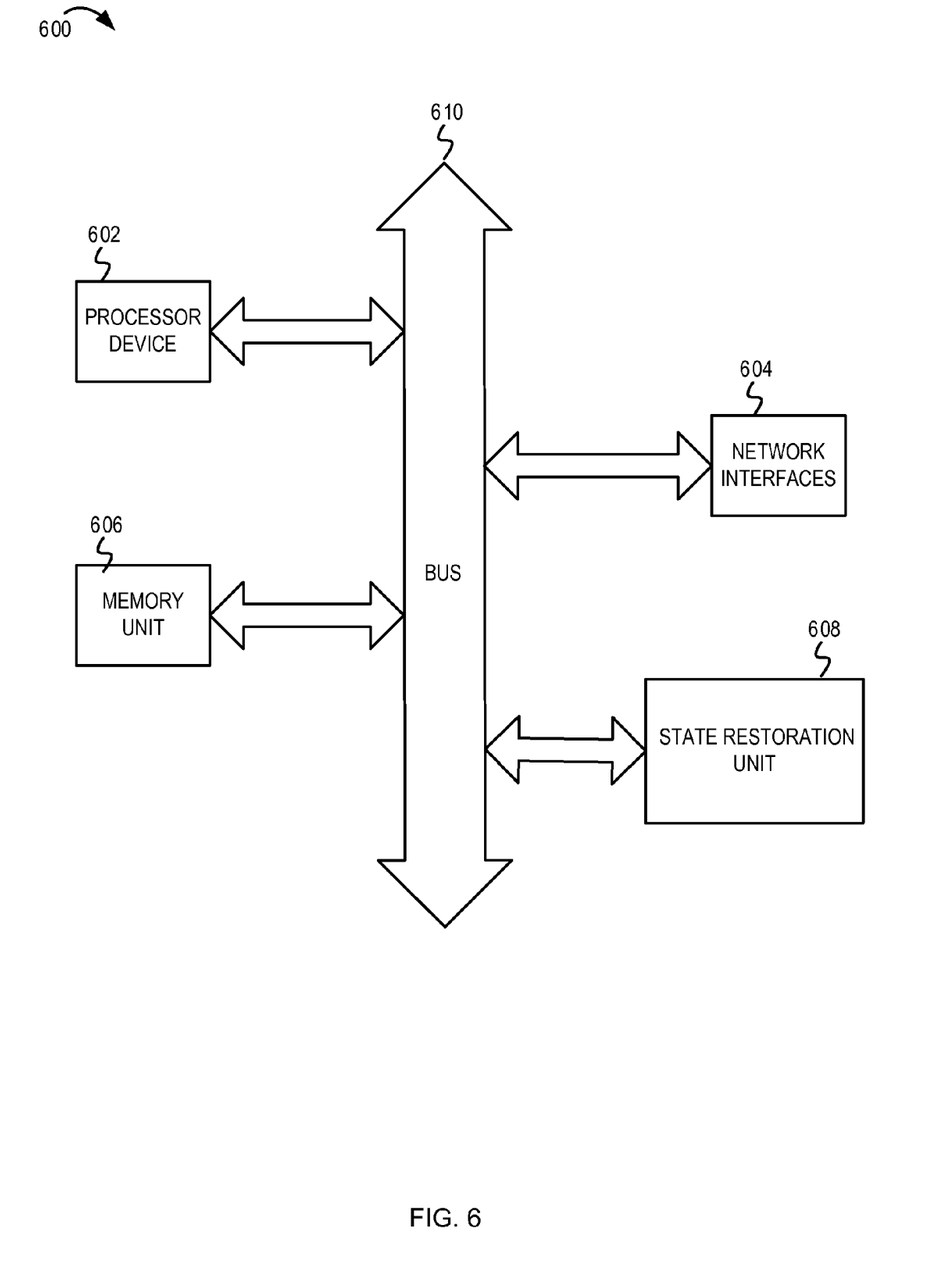
FIG. 6 depicts an example computer system configured for restoring open programs after an operating system failure.

FIG. 6 depicts an example computer system 600 configured for restoring open programs after an operating system failure. The computer system 600 includes a processor device 602 (possibly including multiple processors, multiple cores, multiple nodes, and/or implementing multi-threading, etc.). The computer system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 610 (e.g., PCI bus, ISA bus, PCI-Express bus, HyperTransport® bus, InfiniBand® bus, NuBus bus, etc.) and network interfaces 604 (e.g., an ATM interface, an Ethernet interface, a Frame Relay interface, SONET interface, wireless interface, etc.). The computer system 600 also comprises a state restoration unit 608. The state restoration unit 608 implements functionality for maintaining a current state of an operating system desktop and to restoring open programs after an operating system crash. The state restoration unit 608 detects system calls to open a program/document and to close the program/document. The state restoration unit 608 determines requisite information (e.g., name and location of the programs/documents) from the system calls and keeps track of the open programs/documents. The state restoration unit 608 can store indications of opened programs/documents in a state restoration structure and can remove indications of closed programs/documents from the state restoration structure. In the event of an operating system crash, the state restoration unit 608 uses content of the state restoration structure to identify the programs that were launched prior to the operating system crash and to generate system calls for restoring the programs that were launched prior to the operating system crash.

Any one of these functionalities may be partially (or entirely) implemented in hardware and/or on the processor device 602. For example, the functionality may be implemented with an application specific integrated circuit, in logic implemented in the processor device 602, in a co-processor on a peripheral device or card, etc. Further, realizations may include fewer or additional components not illustrated in FIG. 6 (e.g., video cards, audio cards, additional network interfaces, peripheral devices, storage devices (e.g., optical storage, magnetic storage) etc.). The processor device 602, the memory unit 606, and the network interfaces 804 are coupled to the bus 610. Although illustrated as being coupled to the bus 610, the memory unit 606 may be coupled to the processor device 602.

While the embodiments are described with reference to various implementations and exploitations, it will be understood that these embodiments are illustrative and that the scope of the inventive subject matter is not limited to them. In general, techniques for restoring programs after an operating system failure as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    tracking opening and closing of programs within a computer operating system;
    updating a state restoration structure based, at least in part, on said tracking opening and closing of the programs within the computer operating system;
    after the computer operating system restarts from a failure, accessing the state restoration structure;
        determining that the state restoration structure comprises an indication of a program, wherein the indication of the program comprises a name of the program and location of the program;
        determining that operations for booting the computer operating system were executed in response to failure of the computer operating system based on said determining that the state restoration structure comprises the indication of the program; and
        restoring those of the programs indicated as open in the state restoration structure, wherein said restoring those of the programs indicated as open in the state restoration structure comprises generating a system call with the name of the program and the location of the program to launch the program, wherein the name of the program and the location of the program are read from the state restoration structure.

2. The method of claim 1, wherein said tracking opening and closing of programs within the computer operating system comprises:
   detecting an operating system call to the computer operating system, wherein the operating system call indicates the program; and
   determining that the operating system call will cause the computer operating system to open the program.

3. The method of claim 2, wherein said detecting the operating system call to the computer operating system comprises receiving a notification of the operating system call from the computer operating system.

4. The method of claim 2, wherein said updating the state restoration structure comprises storing the name and the location of the program, as well as one of a name and a location of a document presented by the program, a uniform resource locator that links to the document presented by the program, and a process identifier associated with the program.

5. The method of claim 1, wherein said updating the state restoration structure comprises one of indicating, in the state restoration structure, the programs that are opened by the computer operating system and removing, from the state restoration structure, the programs that are closed by the computer operating system.

6. The method of claim 1, wherein said generating the system call to launch the program comprises:
   generating the system call with additional parameters associated with the program, wherein the additional parameters associated with the program comprises at least one of a name and a location of a document to be presented by the program, and a uniform resource locator that links to the document to be presented by the program; and
   providing the system call to the computer operating system.

7. The method of claim 1, wherein said tracking the opening and closing of programs within the computer operating system comprises:
   detecting an operating system call to the computer operating system, wherein the operating system call indicates a second program; and
   determining that the operating system call will cause the computer operating system to close the second program.

8. The method of claim 7, wherein said updating the state restoration structure comprises removing an indication of the second program from the state restoration structure, based on said determining that the operating system call will cause the computer operating system to close the second program.

9. The method of claim 1, comprising:
   identifying, from the state restoration structure, a plurality of programs that were open prior to the failure of the computer operating system, wherein the plurality of programs includes the program; and
   presenting an interface for selectively opening the plurality of programs that were open prior to the failure of the computer operating system, wherein said generating the system call with the name of the program and the location of the program to launch the program is responsive to a selection of the program via the interface.

10. A computer program product for restoring programs after operating system failure, the computer program product comprising:
   a non-transitory computer readable storage medium having computer readable program code embodied therewith, the computer readable program code configured to,
   track opening and closing of programs within a computer operating system;
   update a state restoration structure based, at least in part, on the computer readable program code tracking opening and closing of the applications within the computer operating system; and
   after a computer operating system restart from a failure, determine that the state restoration structure comprises an indication of a program, wherein the indication of the program comprises a name of the program and location of the program;
   determine that operations for booting the computer operating system were executed in response to failure of the computer operating system based on a determination that the state restoration structure comprises the indication of the program;
   use the state restoration structure to restore those of the programs indicated as open in the state restoration structure after the computer operating system restarts from a failure, wherein the program code configured to use the state restoration structure to restore those of the programs indicated as open in the state restoration structure comprises the program code configured to generate a system call with the name of the program and the location of the program to launch the program, wherein the name of the program and the location of the program are read from the state restoration structure.

11. The computer program product of claim 10, wherein the computer readable program code configured to track opening and closing of programs within the computer operating system comprises the computer readable program code configured to:
   detect an operating system call to the computer operating system, wherein the operating system call indicates the program; and
   determine that the operating system call will cause the computer operating system to open the program.

12. The computer program product of claim 11, wherein the computer readable program code configured to update the state restoration structure comprises the computer readable program configured to store at least one of the name and the location of the program, as well as one of a name and a location of a document presented by the program, a uniform resource locator that links to the document presented by the program, and a process identifier associated with the program.

13. The computer program product of claim 10, wherein the computer readable program code configured to update the state restoration structure comprises one of the computer readable program code configured to indicate, in the state restoration structure, the programs that are opened by the computer operating system and the computer readable program code configured to remove, from the state restoration structure, the programs that are closed by the computer operating system.

14. The computer program product of claim 10, wherein the computer readable program code configured to generate the system call with the name of the program and the location of the program to launch the program comprises the computer readable program code configured to:
   generate the system call with additional parameters associated with the program, wherein the additional parameters comprise at least one of a name and a location of a document to be presented by the program, and a uniform resource locator that links to the document to be presented by the program; and provide the system call to the computer operating system.

15. An apparatus comprising:
a processor;
a network interface coupled with the processor; and
a state restoration unit operable to,
track opening and closing of programs within a computer operating system;
update a state restoration structure based, at least in part, on the state restoration unit tracking opening and closing of the programs within the computer operating system;
after the computer operating system restarts from a failure, access the state restoration structure;
determine that the state restoration structure comprises an indication of a program, wherein the indication of the program comprises a name of the program and location of the program;
determine that operations for booting the computer operating system were executed in response to failure of the computer operating system based on a determination that the state restoration structure comprises the indication of the program; and
restore those of the programs indicated as open in the state restoration structure, wherein the state restoration unit operable to restore those of the programs indicated as open in the state restoration structure comprises the restoration unit being operable to generate the system call with the name of the program and the location of the program to launch the program, wherein the name of the program and the location of the program are read from the state restoration structure.

16. The apparatus of claim 15, wherein the state restoration unit comprises computer readable storage media.

* * * * *